United States Patent [19]

Sciammarella et al.

[11] Patent Number: 5,587,645
[45] Date of Patent: Dec. 24, 1996

[54] BATTERY CHARGER WITH NIGHT LIGHT FOR A CORDLESS TELEPHONE

[75] Inventors: Eduardo Sciammarella, Hoboken; Michael Lang, Ridgewood, both of N.J.

[73] Assignees: Sony Corporation, Tokyo, Japan; Sony Electronics Inc., Park Ridge, N.J.

[21] Appl. No.: 208,540

[22] Filed: Mar. 9, 1994

[51] Int. Cl.$^6$ ....................................................... H02T 7/00
[52] U.S. Cl. ........................................................... 320/2
[58] Field of Search ........................ 320/2, 48; D14/140, D14/142

[56] References Cited

U.S. PATENT DOCUMENTS

| | | |
|---|---|---|
| 4,409,536 | 10/1983 | Evjen .............................. 320/2 |
| 4,467,263 | 8/1984 | Conforti et al. .............................. 320/2 |
| 4,536,694 | 8/1985 | McCarty et al. .............................. 320/2 |
| 4,563,629 | 1/1986 | Keiper .............................. 320/2 X |
| 4,894,601 | 1/1990 | Watkins .............................. 320/48 |
| 5,073,928 | 12/1991 | Shimanuki . |
| 5,075,615 | 12/1991 | Dantis .............................. 320/2 |
| 5,113,127 | 5/1992 | Hoffman et al. . |
| 5,122,721 | 6/1992 | Okada et al. . |
| 5,130,634 | 7/1992 | Kasai . |
| 5,138,351 | 8/1992 | Wiegand et al. .............................. 320/2 |
| 5,144,217 | 9/1992 | Gardner et al. . |
| 5,146,209 | 9/1992 | Beghelli .............................. 340/693 |
| 5,149,185 | 9/1992 | Mandy . |
| 5,157,318 | 10/1992 | Wang . |
| 5,157,320 | 10/1992 | Kuriloff . |
| 5,162,719 | 11/1992 | Tomura et al. . |
| 5,198,743 | 3/1993 | McClure et al. . |
| 5,266,880 | 11/1993 | Newland .............................. 320/48 |

*Primary Examiner*—Peter S. Wong
*Assistant Examiner*—K. Shin
*Attorney, Agent, or Firm*—Pasquale Musacchio; Jerry A. Miller

[57] ABSTRACT

A battery charger having a night light is described for use with a cordless telephone. The battery charger is energized by being plugged into a standard AC outlet and includes a cradle for receiving a cordless telephone handset having rechargeable batteries. The battery charger includes a phototransistor for detecting the level of light impinging on the battery charger and a lamp for providing illumination. When AC power is cut off and the phototransistor detects that the light level is below a predetermined level, the lamp is powered by the handset battery to provide illumination and to enable a user to locate the handset during low light conditions while it is being charged.

3 Claims, 2 Drawing Sheets

BATTERY CHARGER WITH NIGHT LIGHT FOR A CORDLESS TELEPHONE

FIELD OF THE INVENTION

This invention relates generally to cordless telephones, and more particularly, to a battery charger for charging a battery in a cordless telephone handset.

BACKGROUND OF THE INVENTION

A cordless telephone typically includes a portable handset and a stationary base unit. The base unit is electrically connected to a telephone line and includes a cradle for holding the handset in a vertical position. In addition, the base unit and handset each include a radio transmitter and receiver to enable communication between the handset and the base unit and thus the telephone line. This provides a user with substantially more freedom of movement while using the handset than that provided by a conventional telephone having a telephone cord connecting the handset to the base unit.

The handset is energized by a rechargeable battery included in the handset. The base unit includes a battery charger for recharging the handset battery when the handset is placed in the cradle. The battery charger is energized by electrically connecting the battery charger to a standard AC power supply.

In operation, the user removes the handset from the cradle and communicates through the handset while transporting the handset. The handset may be transported a substantial distance away from the base unit during use. By way of example, the handset may be moved to a different room or floor of a house other than the room or floor in which the base unit is located. Moreover, the handset may be moved outside of the house altogether.

The number of locations in a house that provide access to both a telephone line and an AC outlet is typically limited, thus limiting the number of locations where the base unit may be located. Therefore, it may be very inconvenient to transport the handset back to the base unit after each use. As a result, the handset is frequently not returned back to the cradle for recharging.

In many emergency situations, such as during severe storms, hurricanes, tornadoes and others, electrical power to residential areas is cut off due to equipment damage. This leaves many homes without electrical power needed for interior lighting, thus resulting in limited visibility for occupants in the home. Frequently, the telephone system may still be operational although electrical power has been cut off. However, finding a handset in order to be able to place a telephone call may be difficult in low light conditions. Furthermore, the handset may not operate since the handset batteries may require recharging.

Therefore, there is a need for a battery charger, for a cordless telephone, which is portable to thus render recharging of a handset battery more convenient for a user. Furthermore, there is a need for a battery charger, for a cordless telephone, that includes a light which provides emergency illumination when electrical power to a home is cut off and which enables a user to locate a handset while the handset is being recharged.

SUMMARY OF THE INVENTION

A battery charger for a cordless telephone handset having rechargeable batteries, wherein the battery charger is energized by a power supply. The battery charger includes a housing having an aperture for receiving the handset. The housing includes a charging device for recharging the batteries and a light detection device for detecting whether a level of light impinging on the housing is below a predetermined level. The housing further includes an illumination device for providing illumination around said housing and a power supply circuit for supplying electrical power from the power supply to energize the charging device, light detection device and the illumination device. In addition, the housing includes a battery supply circuit for supplying electrical power from the battery to energize the lamp when the power supply is disconnected from the battery charger and when the light detection device detects a level of light below the predetermined level.

DETAILED DESCRIPTION OF THE INVENTION

Figure 1:
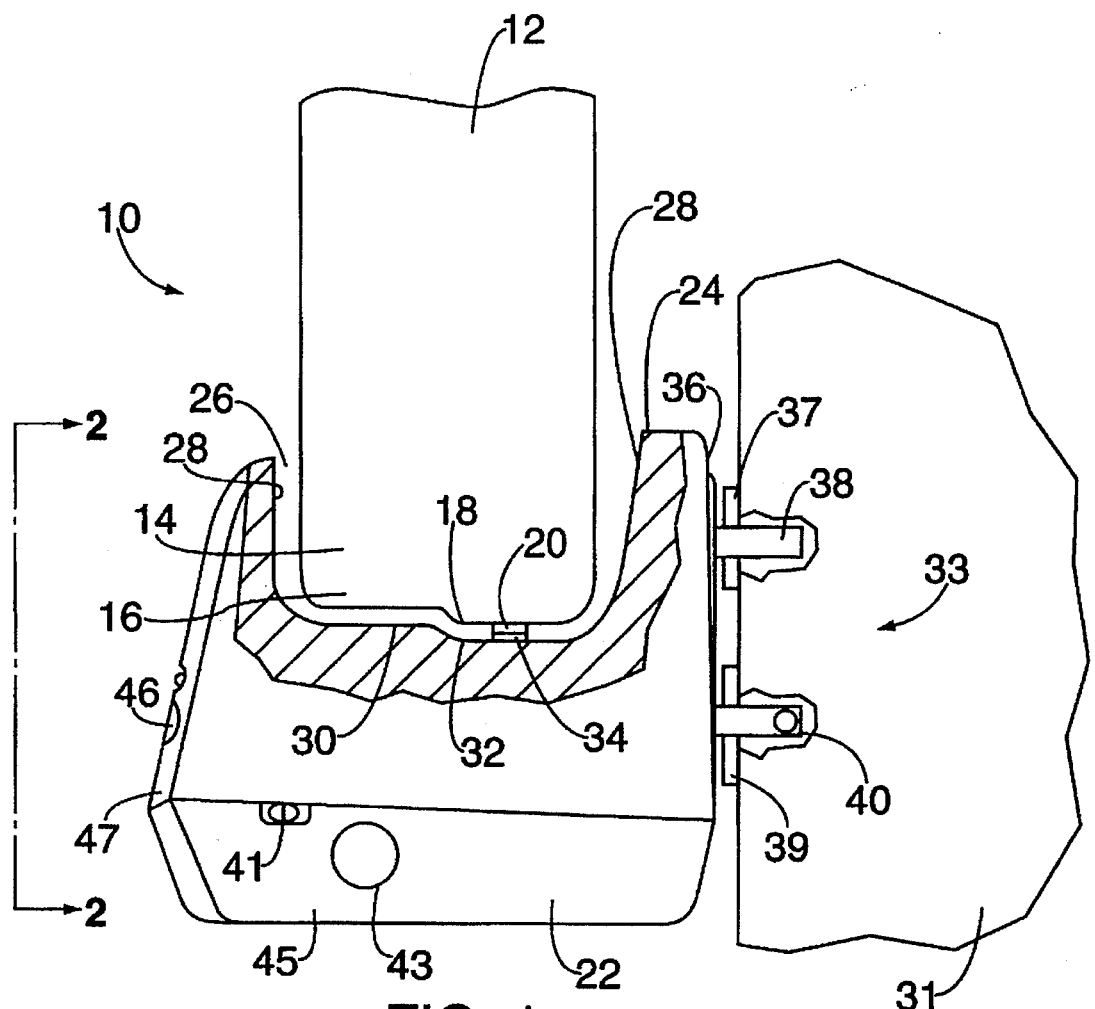
FIG. 1 is a partial cross sectional side view of a charging device in accordance with the present invention.

The present invention will now be described by referring to the following description in conjunction with FIGS. 1–3 wherein like elements are designated by like reference numerals.

Referring to FIG. 1, a partial cross sectional side view of a charging device 10 in accordance with the present invention is shown. The charging device 10 serves to recharge batteries (not shown) of a cordless telephone handset 12 (only a first end 14 of the handset 12 is shown in FIG. 1). The first end 14 of the handset 12 includes substantially horizontal first 16 and second 18 end surfaces. The second end surface 18 includes first 20 and second 21 handset contacts (only the first contact 20 is shown in FIG. 1) which are electrically coupled to the handset battery.

The charging device 10 includes a substantially rectangular housing 22 which houses a battery charger (not shown in FIG. 1) and associated circuitry for recharging the handset battery. The housing 22 includes a downwardly sloping top surface 24 having a cavity or cradle 26 for receiving the first end 14 of the handset 12. The cradle 26 includes substantially vertical sidewalls 28 and horizontal first 30 and second 32 bottom surfaces. The first 30 and second 32 bottom surfaces are adapted to mate with the first 16 and second 18 end surfaces of the handset 12 so as to stably hold the handset 12 in a substantially vertical position. The second bottom surface 32 includes first 34 and second 35 charger contacts (only the first charger contact 34 is shown in FIG. 1) which are electrically coupled to the battery charger. The first 34 and second 35 charger contacts are positioned to mate with the first 20 and second 21 handset contacts, respectively, so as to electrically couple the battery charger to the battery.

A phototransistor 43 is located on a first surface 45 of the housing 22. The phototransistor 43 serves to detect the level of light which impinges upon the first surface 45 of the charging device 10. In addition, an indicator lamp 46 is located on a front surface 47 of the housing 22. The lamp 46 serves to illuminate an area in from of the from surface 47. This enables a user to locate the charging device 10 in low light conditions. The lamp 46 is energized and emits light when the phototransistor 43 detects that the light level in the area immediately surrounding the light sensor 43 is below a predetermined light level. It is noted that the lamp 46 and the phototransistor 43 are positioned such that light from the lamp 46 is not detected by the phototransistor 43. As will be described, the lamp 46 is also energized when AC power is cut off. Furthermore, the charging device 10 includes a switch 41 which serves to turn the lamp 46 on or off.

In addition, the housing 22 includes a substantially vertical mounting surface 36 having an upper pair of prongs 38 extending therefrom (only one prong of the upper prongs 38 are shown in FIG. 1). The upper prongs 38 are adapted to be slidably inserted into and electrically connect with either an upper 37 or lower 39 pair of receptacles of a standard AC power outlet 33 (only one receptacle of each receptacle pair 37,39 is shown) located in a wall 31. In addition, the upper prongs 38 are electrically coupled to the battery charger in the charging device 10. As such, insertion of the upper prongs 38 into either receptacle pair 37,39 of a standard AC power outlet 33 provides power suitable for energizing the battery charger. As will be described, the housing 22 further includes indicator lights which serve to indicate whether the battery charger is energized and whether the handset battery is being recharged. The charging device 10 has relatively small exterior dimensions. By way of example, the charging device 10 may be approximately 112 mm long, 102 mm high and 99 mm wide. As such, the charging device 10 is sufficiently small to facilitate portability of the charging device 10 by a user.

Furthermore, the upper prongs 38 are sized for snug insertion into the either receptacle pair 37,39. This enables the charging device to be removably secured to the AC outlet 33 and to stably hold the charging device 10 and the handset 12. It is noted that the housing 22 may include a lower pair of prongs 40 extending from the mounting surface 36. The lower prongs 40 are also adapted to be slidably inserted into a receptacle pair 37,39 of the AC outlet 33. The lower prongs 40 are spaced relative to the upper prongs 38 so as to enable insertion of the upper 38 and lower 40 prongs into the upper 37 and lower 39 receptacles, respectively, of the AC outlet 33. This provides further stability for the charging device 10 and the handset 12.

As such, the charging device 10 may be inserted into any AC outlet of a house. The handset 12 may then be inserted into the charging device 10 and is stably held by charging device 10. In addition, an electrical connection is formed between the first 34 and second 35 charger contacts and the first 20 and second 21 handset contacts, respectively. This enables charging of the handset battery at any location in the house having an AC outlet.

Other techniques may be used to removably secure the charging device 10 to the AC outlet 33 and to provide further stability for the charging device 10. One technique includes adding a third ground prong (not shown) to both of the upper 38 and lower 40 prongs. It is noted that many AC receptacle pairs include a third, or ground, receptacle. The third prong is adapted to be inserted into and electrically connect with the ground receptacle. This provides electrical grounding as well as providing further stability for the charging device 10.

Figure 2:
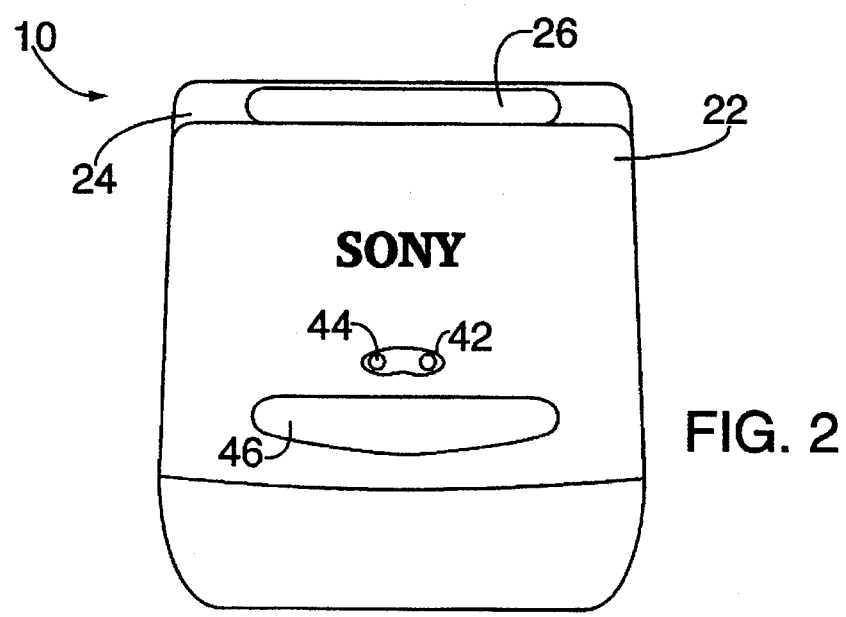
FIG. 2 is a from view of the charging device along line 2—2 of FIG. 1.

Referring to FIG. 2, a front view of the charging device 10, without the handset 12, is shown along line 2—2 of FIG. 1. The charging device 10 includes a power indicator LED 42 for indicating that the charging device 10 is energized. In addition, the charging device 10 includes a charge indicator LED 44 for indicating that the handset battery is being recharged.

Figure 3:
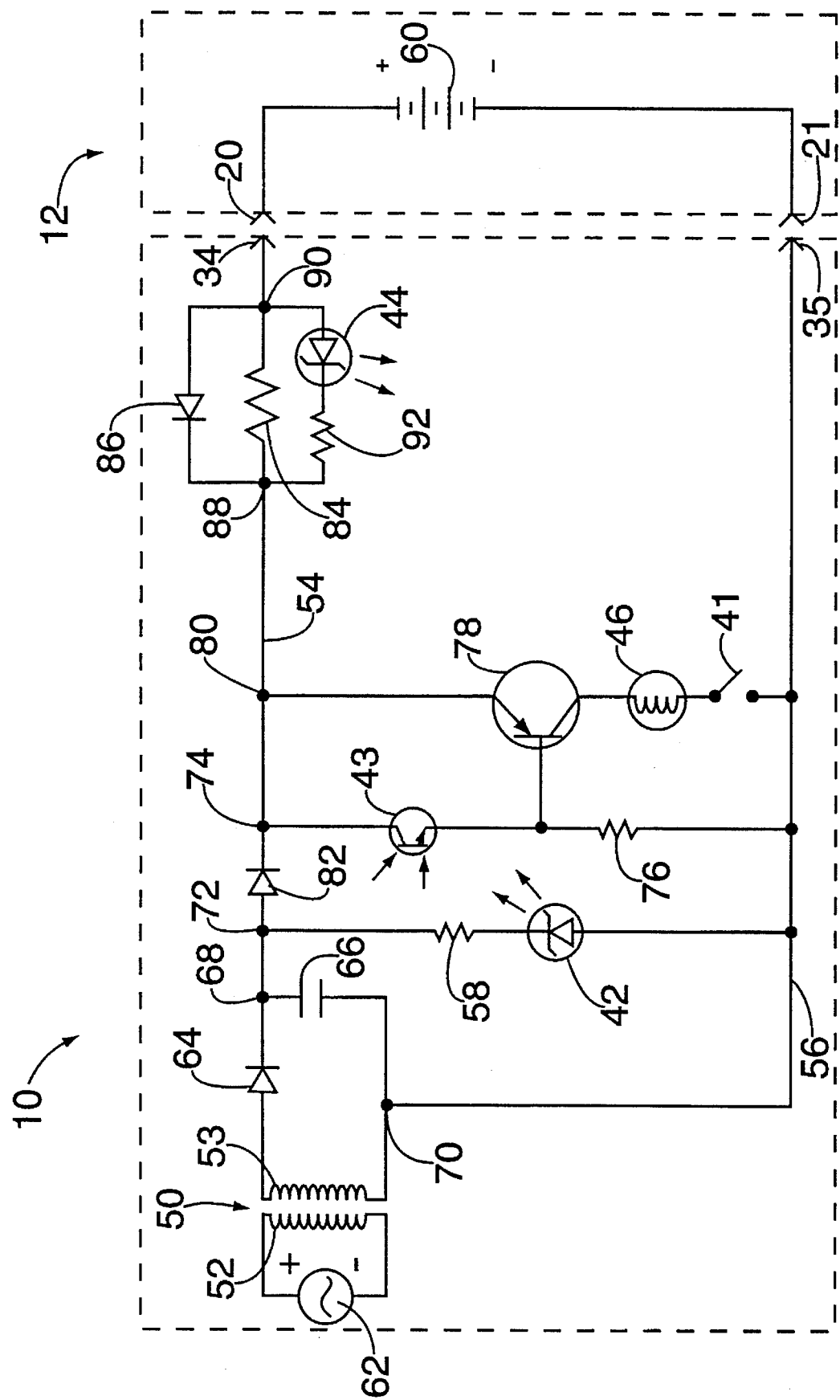
FIG. 3 is a schematic diagram of the charging device.

Referring to FIG. 3, a schematic diagram for one embodiment of the charging device 10 and handset 12 having a handset battery 60 is shown. The charging device 10 includes a transformer 50 having primary 52 and secondary 53 windings. The primary winding 52 is connected across a standard AC power supply 62. One terminal of the secondary winding 53 is connected to the anode of a first diode 64. The cathode of the first diode 64 and a positive terminal of a capacitor 66 are connected to form a first node 68. The first node 68 is electrically connected to a supply line 54. A second terminal of the secondary winding 53 is connected to a negative terminal of a capacitor 66 to form a second node 70. The second node 70 is connected to a return line 56. When AC power is available, the transformer 50 serves to reduce the line voltage to a suitable charging voltage. The charging voltage is then rectified by first diode 64 and filtered by capacitor 66.

The cathode of the power indicator LED 42 previously described is connected to the first terminal of a first resistor 58. The second terminal of the first resistor 58 is connected to the supply line 54 to form a third node 72. The anode of the power indicator LED 42 is connected to the return line 56. The power indicator LED 42 is turned on by current supplied through first resistor 58 when AC power is available to indicate that the charging device 10 is energized.

The collector of the phototransistor 43 previously described is connected to the supply line 54 to form a fourth node 74. The emitter of the phototransistor 43 is connected to the return line 56 through a second resistor 76. The base of a PNP transistor 78 is connected between the second resistor 76 and the emitter of the phototransistor 43. The emitter of the PNP transistor 78 is connected to the supply line 54 to form a fifth node 80. The lamp 46 is connected between the collector of the PNP transistor 78 and a first terminal of switch 41. A second terminal of switch 41 is then connected to the return line 56. The charging device 10 further includes a second diode 82 having a cathode connected to the fourth node 74. The anode of the second diode 82 is connected to the third node 72. Referring to FIG. 3 in conjunction with FIG. 1, the phototransistor 43 serves to detect the level of light which impinges upon the first surface 45 of the charging device 10 and is optically isolated from lamp 46.

The charging device 10 and the handset 12 are electrically connected by placing the handset 12 in the cradle 26 such that the first 34 and second 35 charger contacts mate with the first 20 and second 21 handset contacts to form an electrical connection as previously described. Referring back to FIG. 3, a third resistor 84 is connected between the fifth node 80 and the first charger contact 34. In addition, the charge indicator LED 44 and a third diode 86 are connected in parallel with the third resistor 84. The cathode of the third diode 86 is connected to the supply line 54 in between the third resistor 84 and the fifth node 80 to form a sixth node 88. The cathode of the charge indicator LED 44 is connected through a fourth resistor 92 to the sixth node 88. The anodes of the charge indicator LED 44 and of the third diode 86 are connected to the supply line 54 in between the third resistor 84 and the first charger contact 34 to form a seventh node 90.

When AC power is available, second diode 82 is forward biased which supplies current to charge indicator LED 44 through fourth resistor 92. Current flows from node 88 to 90 through battery 60 to charge the battery 60. The third resistor 84 determines the amount of charging current supplied to the battery 60. In the condition where power is present, second diode 82 is forward biased and third diode 86 is reversed biased. Thus, the bias supply for PNP transistor 78 and phototransistor 43 are supplied from the power supply 62. When light strikes phototransistor 43, it effectively short circuits node 74 to the base of PNP transistor 78, thus, cutting off PNP transistor 78 and inhibiting the current flow through lamp 46. When no light strikes phototransistor 43, PNP transistor 78 is turned on causing current to flow through lamp 46. If switch 41 is in the open position, the lamp 46 is turned off regardless of the light and power condition.

If AC power is cut off during low light conditions, the battery 60 is used to supply power to lamp 46. When the AC power is cut, battery 60 reverse biases second diode 82 prohibiting a current from turning on power indicator LED 42. Thus, second diode 82 isolates the circuit at the left of node 74 when power fails. Phototransistor 43 and PNP transistor 78 are thus biased by battery 60. Thus, current flows from node 90 to node 88 through the third diode 86 and third resistor 84. When no light strikes photo transistor 43, second resistor 76 turns on PNP transistor 78 causing current to flow from battery 60 through lamp 46 and switch 41 (if switch 41 is in the closed position). Charge indicator LED 44 is turned off in this condition since it is forward biased.

Thus, when AC power is available and the handset 12 is placed in the cradle 25 of the charging device 10, the power indicator 42 is on which indicates that the charging device 10 is energized and the charge indicator 44 LED is on to indicate that the a battery 60 is being recharged. In addition, if the switch 41 is in the closed position, the lamp 46 is on and provides illumination.

Furthermore, when AC power is cut off during low light conditions and the switch 41 is in the closed position, the lamp 46 is powered by the battery 60 on the handset 12 and thus remains on. In addition, the power indicator 42 and charge indicator 44 LED's are turned off. As such, the charging device 10 provides emergency illumination powered by the battery 60 which enables the user to find the handset 12 during low light conditions.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A battery charger, wherein said battery charger is energized by a power supply and said power supply is accessible through an electrical outlet having upper and lower receptacle pairs, comprising:

a housing having an aperture for receiving a cordless telephone handset having rechargeable batteries and handset contacts electrically connected to said batteries, wherein said housing includes charger contacts for forming an electrical connection with said handset contacts;

upper and lower prongs extending from said housing, said upper and lower prongs being adapted to be inserted into said upper and lower receptacle pairs, respectively, for removably securing said housing to said electrical outlet when said handset is positioned within said aperture;

said housing including:

charging means for charging said batteries, said charging means being electrically connected to said charger contacts and including an indicator disposed on said housing for indicating that said battery is being charged; a phototransistor for detecting whether a level of light impinging on said housing is below a predetermined level;

a lamp disposed on said housing for providing illumination adjacent said housing;

first circuit means for supplying electrical power from said power supply to energize said charging means, said light sensing means and said lamp;

second circuit means for supplying electrical power from said battery to energize said lamp when said power supply is disconnected from said battery charger and when said light detection means detects a level of light below said predetermined level; and a switch for turning said lamp on or off.

2. A battery charger according to claim 1, further including a power indicator means for indicating that said battery charger is energized.

3. A battery charger according to claim 1, wherein said indicator is an LED.

\* \* \* \* \*